(12) United States Patent
Ferree et al.

(10) Patent No.: US 6,681,553 B2
(45) Date of Patent: Jan. 27, 2004

(54) MOWER CUTTING CHAMBER

(75) Inventors: Philip Eugene Ferree, Beaver Dam, WI (US); John Boyd Kuhn, Rubicon, WI (US); Christian J. Heuvel, Henglo (NL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/921,503

(22) Filed: Aug. 2, 2001

(65) Prior Publication Data

US 2003/0051457 A1 Mar. 20, 2003

(30) Foreign Application Priority Data

Sep. 9, 2000 (DE) .......................................... 100 44 595

(51) Int. Cl.[7] ............................................... A01D 67/00
(52) U.S. Cl. ........................ 56/320.1; 56/13.6; 56/17.5
(58) Field of Search ................................. 56/17.5, 16.9, 56/320.1, 320.2, 295, 255, DIG. 20

(56) References Cited

U.S. PATENT DOCUMENTS

| 4,189,903 | A | * | 2/1980 | Jackson et al. .............. 56/17.5 |
| 4,502,271 | A | * | 3/1985 | Hansen et al. ................ 56/13.6 |
| 4,890,446 | A | | 1/1990 | Israel .......................... 56/17.5 |
| 5,035,108 | A | * | 7/1991 | Meyer et al. ................. 56/13.4 |
| 5,191,756 | A | * | 3/1993 | Kuhn .......................... 56/13.4 |
| 5,267,429 | A | * | 12/1993 | Kettler et al. ................. 56/295 |
| 5,305,589 | A | * | 4/1994 | Rodriguez et al. ........... 56/17.4 |
| 5,465,564 | A | * | 11/1995 | Koehn et al. ................ 56/13.6 |
| 5,609,011 | A | * | 3/1997 | Kuhn et al. .................. 56/17.5 |
| 5,765,346 | A | * | 6/1998 | Benter et al. ................ 56/17.4 |
| 5,791,132 | A | | 8/1998 | Wiedenmann ............. 56/320.1 |
| 5,845,475 | A | * | 12/1998 | Busboom et al. ............ 56/17.4 |
| 6,052,980 | A | * | 4/2000 | Friesen ........................ 56/16.9 |
| 6,189,307 | B1 | * | 2/2001 | Buss et al. ........................ 56/2 |
| 6,192,666 | B1 | * | 2/2001 | Sugden et al. ............... 56/13.6 |

FOREIGN PATENT DOCUMENTS

| DE | 298 16 120 U1 | 1/1999 |
| WO | WO 96/20584 | 7/1996 |

* cited by examiner

*Primary Examiner*—Árpád F+e Kovács

(57) ABSTRACT

A cutting chamber for a mower deck blade is comprised of first and second adjoining skirt members of differing lengths to provide for a lifting air stream at the front of the chamber and a discharging air stream at the rear of the chamber. As a result, cut material can be recut in a mulching action and then easily discharged to the rear of the deck.

7 Claims, 4 Drawing Sheets

MOWER CUTTING CHAMBER

FIELD OF THE INVENTION

The present invention relates generally to mower decks and more particularly to the cutting chamber surrounding the mower blade.

BACKGROUND OF THE INVENTION

Mower decks utilized in cutting vegetation are frequently used in conditions that result in plugging and/or clogging of the cutting chamber and/or the discharge opening of the deck. Conditions which contribute to such clogging include wet, heavy and/or long grass or vegetation. To assist in lifting the vegetation to cut it in these conditions, the blades are enclosed within depending cylindrical chambers comprised of skirts or rings. These chambers contain the air stream generated by the rotating blade and assist in lifting blades of growing vegetation to cut it at the proper height.

While the chambers improve the cutting of material under these conditions, clogging can still occur as the material is moved to the discharge opening, which is typically at one side of the deck. When a deck is equipped with a plurality of blades and the cut materials move across the deck to a side discharge opening, plugging can become particularly troublesome.

One attempt to reduce such plugging provides for a discharge opening for each cutting blade with the opening being provided at the rear of the deck. While this design improves the discharge of material, the cutting chamber skirts surrounding the blades and the limited discharge opening still contribute to plugging.

Accordingly, it would be desirable to provide a cutting deck designed to operate in wet, heavy and/or long vegetation conditions without incurring significant plugging and/or clogging.

Further, it would be desirable to provide a cutting chamber that can retain the air stream generated by the blade in order to lift the blades and/or stalks of wet, heavy and/or long vegetation prior to it being cut.

It would further be desirable to provide a cutting chamber and deck that permit the cut material to be effectively discharged.

SUMMARY OF THE INVENTION

Towards these ends, there is provided a deck that includes a cutting chamber for each blade that serves to maintain the air stream necessary to lift wet, heavy and/or long blades and/or stalks of vegetation.

There is further provided a substantial opening at the rear of the deck that serves as a discharge opening for material cut by the blade.

To allow the cut material within the chamber to exit easily, the vertical dimension of the rear portion of the chamber adjacent to the discharge opening of the deck is less than that of the forward portion of the chamber.

With the improved deck and chamber design, a mower capable of cutting and discharging wet, heavy and/or long vegetation is provided.

DESCRIPTION OF THE PREFERRED EMBODIMENT

Figure 1:
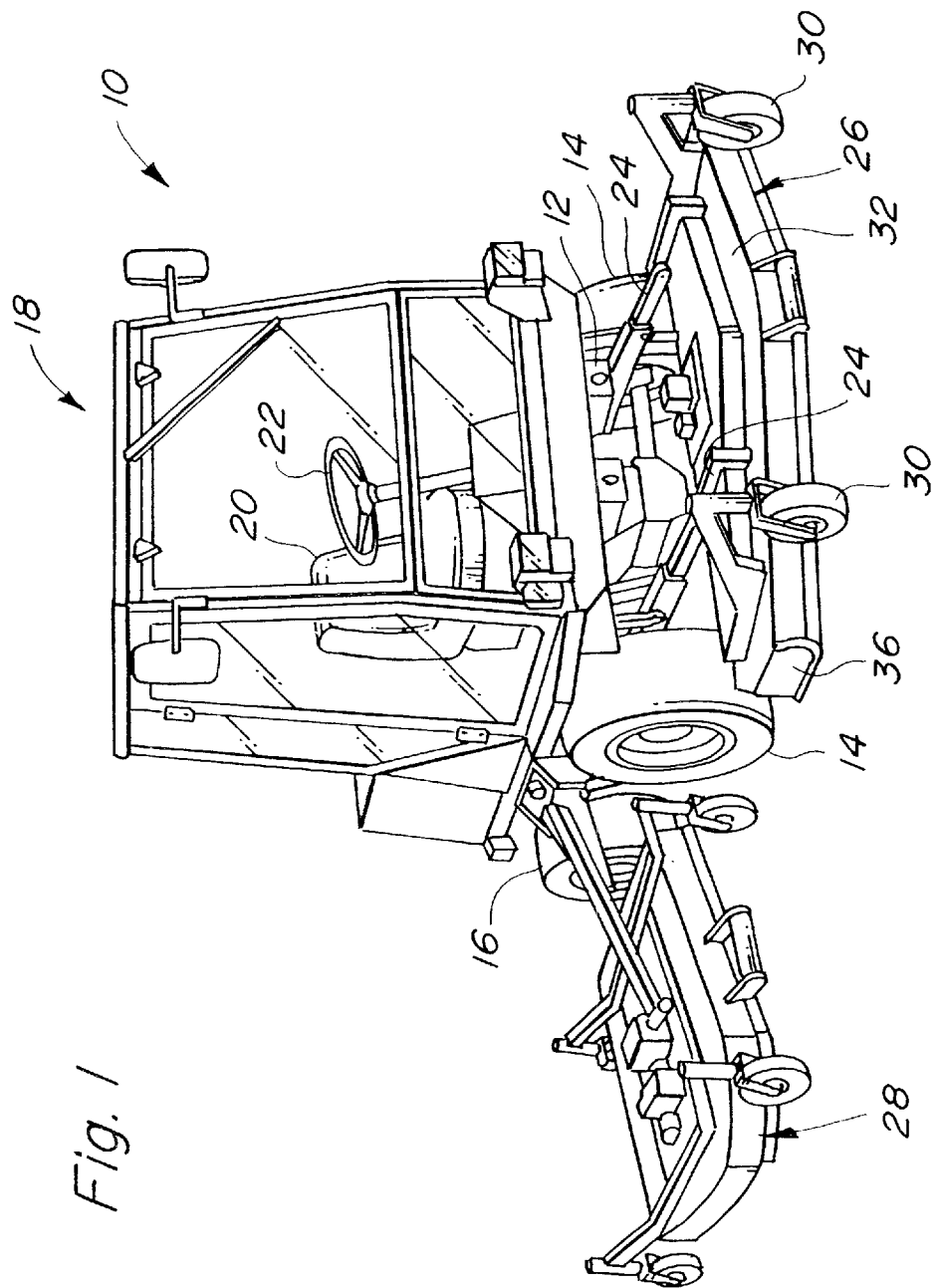
FIG. 1 illustrates a front elevated perspective view of a front mount mower equipped with mower decks utilizing the present invention.

Looking first to FIG. 1, there is illustrated a vehicle in the form of a front mount mower 10 such as would be used to mow the grass and/or vegetation in parks. The vehicle 10 includes a chassis or frame 12 which is supported by steerable front wheels 14 and rear wheels 16 which are driven by an engine. An operator's platform or station 18 is carried on the frame 12 and takes the form of an enclosed cab in which there is provided an operator seat 20, steering wheel 22 and standard equipment for maneuvering the vehicle that need not be specifically illustrated.

At the front of the vehicle frame 12 are carried a pair of support arms 24 that are attached to the front and side of the frame 12. The other ends of each support arm 24 are attached at the front of the mower deck 26. A similar deck 28 is carried at each rear side of the vehicle 10. Since the decks are substantially identical, only the front deck 26 will be discussed in detail.

At the front of the deck 26 are carried a pair of gauge wheels 30 for supporting the forward end of the deck 26 as it moves over the ground. The gauge wheels 30 are adjustably attached to permit the height of the cut provided by the deck 26 to be adjusted.

Figure 2:
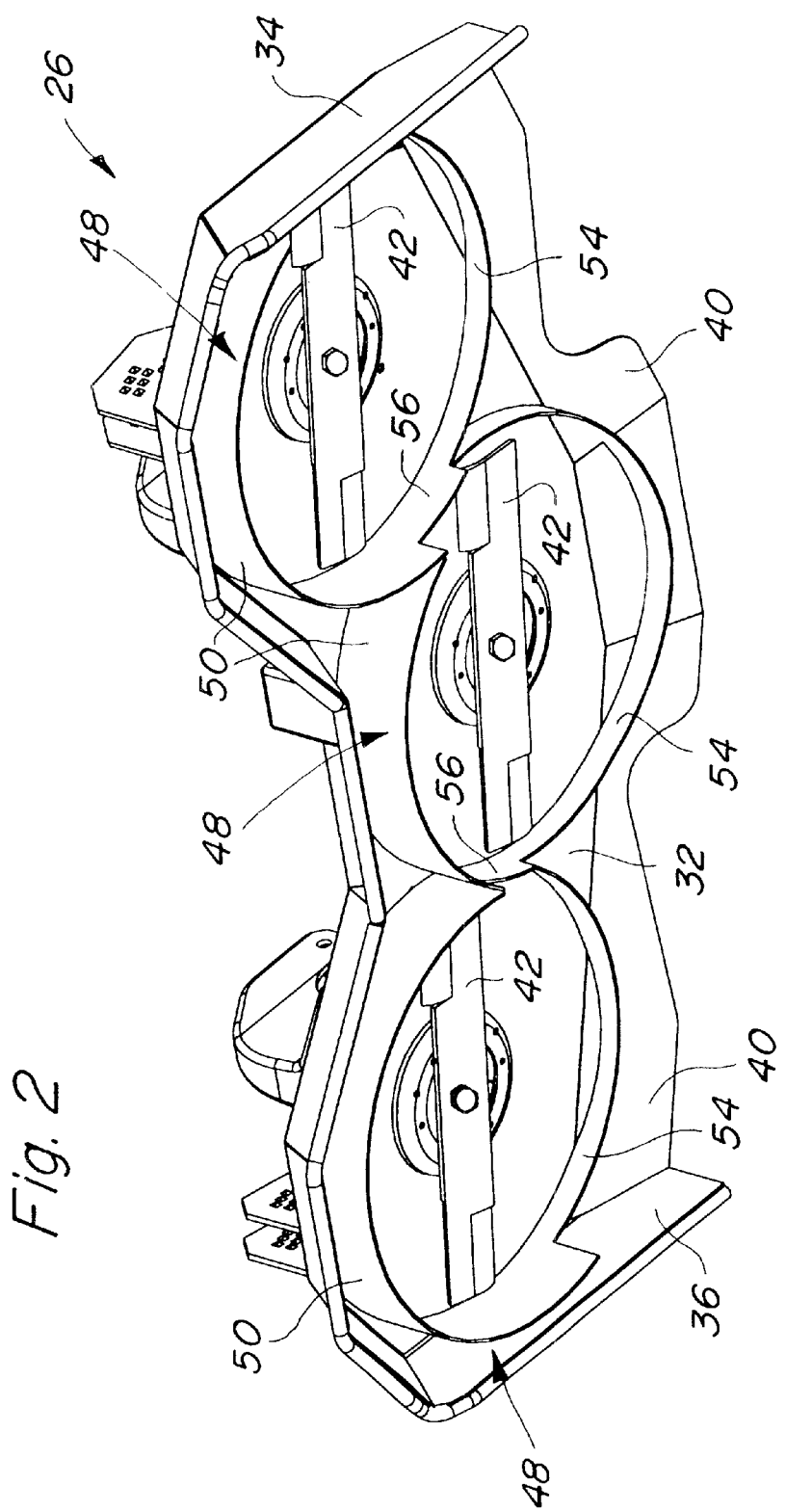
FIG. 2 illustrates the underside of a mower deck having a plurality of cutting blades, each blade equipped with a cutting chamber constructed in accordance with the present invention.
Figure 3:
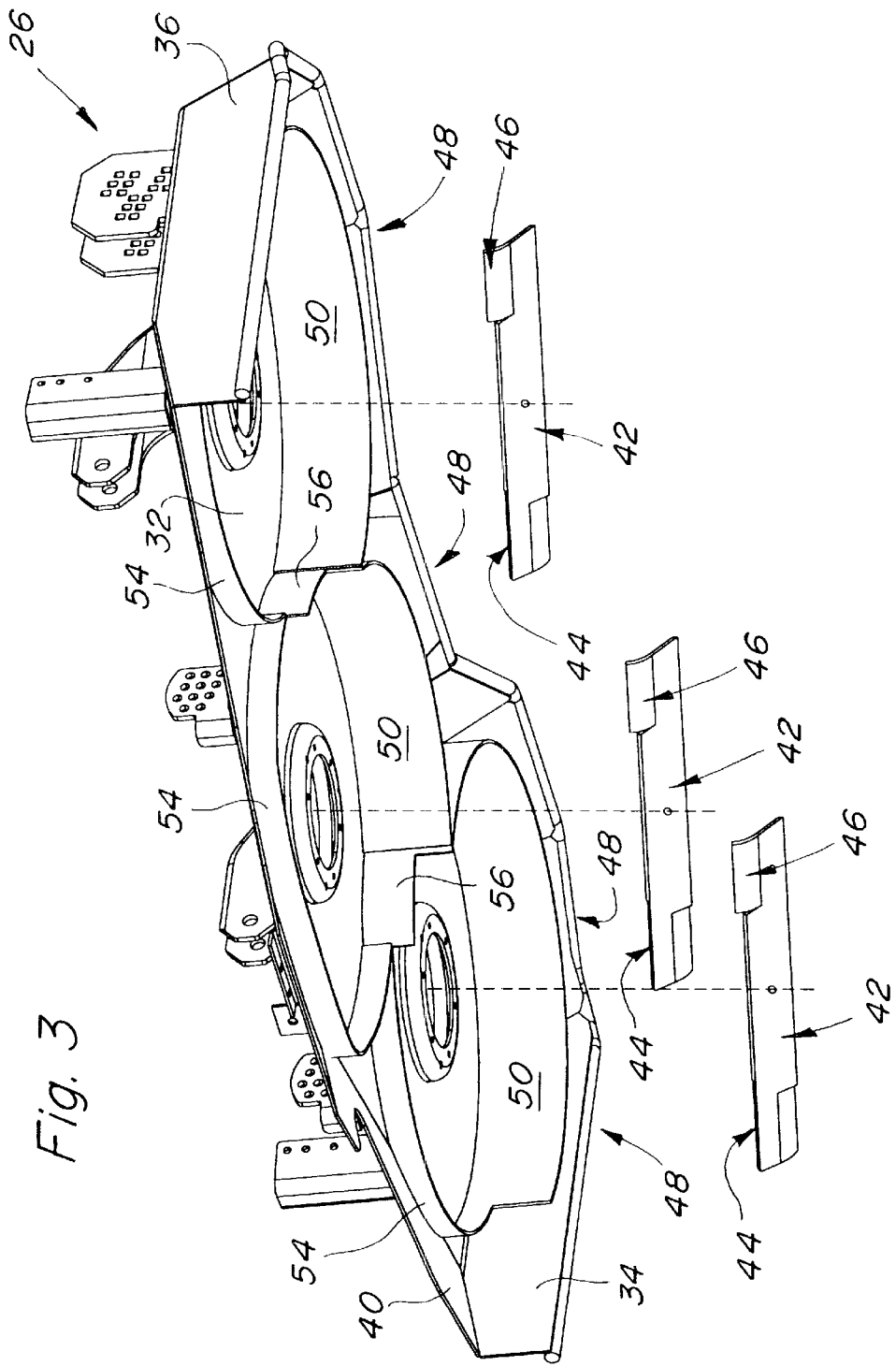
FIG. 3 illustrates a view similar to FIG. 2, but from a rear perspective and illustrating the discharge opening of the deck as well as the blade chambers.

Looking now to FIGS. 2 and 3 which illustrate the underside of the deck 26 in greater detail, there will be found views of the forward underside portion and the rearward underside portion.

Figure 4:
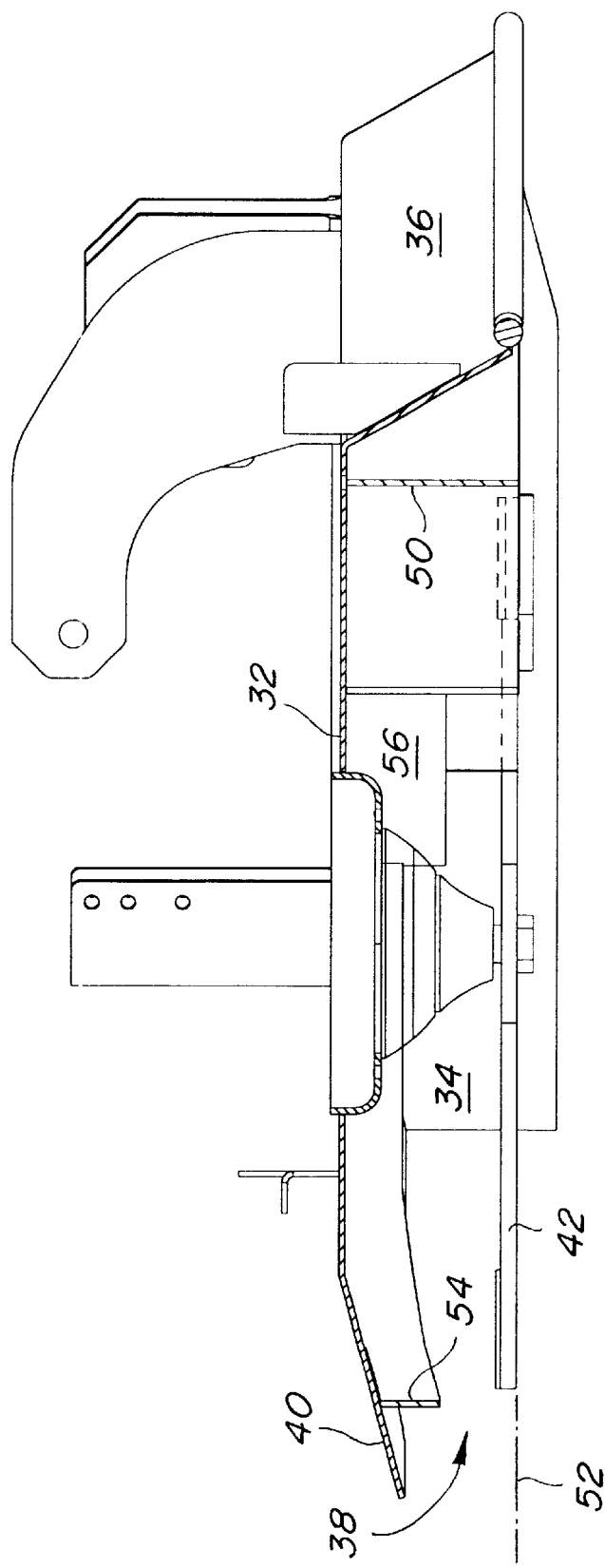
FIG. 4 illustrates a view taken along lines 4—4 of FIG. 2.

The deck 26 includes a housing with depending top, left and right side surfaces 32, 34 and 36. At the rear of the deck 26, as best seen in FIG. 4, there is provided a discharge opening 38 that extends across the complete width of the deck 26. The top surface 32 of the deck 26 extends horizontally and includes downwardly sloping extension 40 adjacent the rear discharge opening 38. It is preferred to put the discharge opening 38 at the rear of the deck 26 so that discharged material is not deposited in the path of uncut grass.

As illustrated, the deck 26 depicted in FIGS. 2 and 3 are equipped with three separate blades 42 which are drivingly powered in a conventional fashion that need not be shown. Each blade 42 is provided with a cutting edge 44 and a lifting edge 46, the lifting edge 46 being provided to create the air stream that would be generated to lift the blades of grass or stalks of vegetation upwardly to allow the cutting edge 44 to sever it.

Surrounding each cutting blade 42 is a chamber 48 that is comprised of downwardly extending rings or skirts attached to the top surface 32 of the deck 26. These skirts are constructed of metal in the preferred embodiment, but could be made of plastic or composites. At the forward edge of the deck 26 and each blade 42 is provided the first downwardly extending skirt member or portion 50. This skirt member 50 has a depth sufficient to reach the level of the cutting plane 52 of the blade 42 therein. At the rear of the deck 26, as best illustrated in FIG. 3, is provided a second downwardly depending skirt member or portion 54 of substantially less depth, the depth being approximately ¼ of the distance between the top surface 32 of the deck 26 and the cutting plane 52 of the blade 42. Thus, as can be seen in FIGS. 2–3, the first and second skirt members 50 and 54, respectively, are in "tiered" relationship to one another. In the preferred embodiment, the first and second skirt members 50 and 54 are adjoined by a third skirt member or portion 56 to comprise the center cutting chamber 48.

It is the purpose of the first, second and third skirts 50, 54 and 56 to provide the cutting chamber 48 within which the blade 42 operates. The first or forward skirt member 50 functions to contain the air stream generated by the cutting blade 42 and create the vacuum to lift the grass for cutting, and then maintain the grass cuttings within the air stream for recutting to achieve a mulching effect.

The rear or second skirt member 54 of the cutting chamber 48, in the preferred embodiment being about ¼ of the distance between the top surface 32 of the deck 26 and the cutting plane 52 of the blade 42, permits air and cut grass particles to escape from the cutting chamber 48 as it is moved toward the rear of the chamber 48 and the discharge opening 38. Accordingly, the air as well as the cut grass being carried therein are expelled rearwardly and out the discharge opening 38 at the rear of the deck 26.

The transitional or third skirt member 56 provides for a reduction in the vacuuming or lifting effect between the front and rear skirts 50 and 54. These transitional skirt members 56 are provided at the sides of the chamber 48 where the adjacent chambers 48 meet and air flow between them is at a minimum. In the preferred embodiment, the lower edge of the first, second and third skirt members 50, 54 and 56 are essentially parallel to the cutting plane 52 of the blade 42 across their full width.

The second skirt member 54 preferably extends around ½ or less of the width of the cutting chamber 48. Should it be preferred, the proportion of the chamber 48 equipped with the shortened skirt member 54 could be lessened and the proportion of the chamber 48 surrounded by the longer skirt 50 could be increased in order to increase the vacuum or lifting effect within the chamber 48.

Should additional lifting capability be desired, the front or first skirt member 50 could also be extended further around the circumference or periphery of the chamber 48. Should a greater ability to discharge material be desired, the proportion of the circumference of the cutting chamber 48 around which the second member or smaller ring 54 extends could be expanded.

In operation, the mower deck 26 is moved across the ground by a vehicle 10 such as that depicted in FIG. 1. As it moves across the ground, the blades 42 would be rotated within their respective cutting chambers 48. The lifting portion 46 of each blade 42 would create an upwardly directed air stream or vacuum that would tend to lift the grass and/or vegetation. As the cutting edge 44 of the blade 42 then came around, it would then shear the vegetation. The cut vegetation would then move around in a circular air stream that would be contained by the first, second and third skirt members 50, 54 and 56. As the cut material is moved around and around within the chamber 48, it continues to fall and rise and be recut and recut. As it moves toward the back of the chamber 48, the vacuum or lifting effect is reduced due to the short dimension of the second or rear skirt member 54 and therefore the air stream and cut material carried therein tends to be expelled through the discharge exit 38 at the rear of the deck 26.

In the preferred embodiment, a plurality consisting of three cutting blades are provided in the deck. Of course, a single or any preferred number of blades could be provided in the deck as might be desired.

Having described the preferred embodiment, it will become apparent that various modifications can be made without departing from the scope of the invention as defined in the accompanying claims.

We claim:

1. A mower deck of one-piece construction, the deck having a housing with a top, front and side surfaces depending therefrom, with the rear of the deck being substantially free of obstruction so as to permit discharge of material therefrom,
   a cutting blade drivingly supported by the deck to rotate in a generally circular and horizontal plane, the improvement comprising:
   a cylindrical chamber surrounding the blade and depending from the top surface of the deck, said chamber comprised of first and second skirt portions, the first skirt portion enclosing the forward and side portions of the chanter and extending between the top surface of the deck to approximately the plane of the blade,
   and the second skirt portion being operatively joined with the first portion and extending from the top surface of the deck downwardly substantially less than the distance to said plane, the first and second skirt portions being adjacent, and in tiered relationship to one another.

2. The invention defined in claim 1 wherein the second skirt portion extends downwardly at least ¼ of the distance to said plane.

3. The invention defined in claim 1 wherein the second skirt portion extends around more than ½ of the chamber of the blade.

4. The invention defined in claim 1 wherein the chamber is comprised of a third skirt portion which interconnects the first and second skirt portion, said third portion extending downwardly from the top surface of the deck a distance less than the first portion extends downwardly, but greater than that which the second portion extends downwardly.

5. The invention defined in claim 1 wherein the deck includes a rear surface depending from the top surface, said rear surface extending downwardly approximately ¼ of the distance between the top surface and the plane of the blade.

6. The invention defined in claim 1 wherein the deck includes laterally spaced left, center and right blades, each blade having a cylindrical chamber comprised of first and second skirt portions surrounding it, wherein the first and second skirt portions surrounding the center blade are operatively joined by a third skirt portion that extends downwardly from the top surface a distance less than the first portion but greater than that of the second portion.

7. The invention defined in claim 6 wherein the deck includes a rear surface depending from the top surface, said rear surface extending downwardly approximately ¼ of the distance between the top surface and the plane of at least one of the blades.

* * * * *